(12) United States Patent
Desai et al.

(10) Patent No.: US 12,588,586 B2
(45) Date of Patent: Mar. 31, 2026

(54) BATTERY LATCHING MECHANISM FOR POWER EQUIPMENT, AND LAWNMOWER

(71) Applicant: Honda Motor Co., Ltd., Tokyo (JP)

(72) Inventors: Shivang Desai, Carrboro, NC (US); Christopher Todd Walker, Hillsborough, NC (US); Surender Kumar, Mebane, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 594 days.

(21) Appl. No.: 18/111,135

(22) Filed: Feb. 17, 2023

(65) Prior Publication Data

US 2024/0276912 A1 Aug. 22, 2024

(51) Int. Cl.

| | |
|---|---|
| *A01D 34/78* | (2006.01) |
| *A01D 34/68* | (2006.01) |
| *A01D 34/74* | (2006.01) |
| *A01D 43/063* | (2006.01) |
| *B60L 50/64* | (2019.01) |

(Continued)

(52) U.S. Cl.
CPC ............. *A01D 34/68* (2013.01); *A01D 34/74* (2013.01); *A01D 34/78* (2013.01); *A01D 43/063* (2013.01); *A01D 43/0631* (2013.01); *B60L 50/64* (2019.02); *H01M 50/209* (2021.01); *H01M 50/213* (2021.01); *H01M 50/247* (2021.01); *H01M 50/262* (2021.01); *A01D 2101/00* (2013.01); *B60K 1/04* (2013.01);

(Continued)

(58) Field of Classification Search
CPC ........ A01D 34/68; A01D 34/78; A01D 34/81; B60K 1/04; B60K 2001/0466; B60K 2001/0494; H01M 50/242–256; H01M 50/262
See application file for complete search history.

(56) References Cited

U.S. PATENT DOCUMENTS

| | | | |
|---|---|---|---|
| 7,413,460 B2 * | 8/2008 | Matthias | ................... B25F 5/02 173/217 |
| 7,701,172 B2 * | 4/2010 | Watson | ................... B23B 45/02 320/113 |

(Continued)

FOREIGN PATENT DOCUMENTS

| | | |
|---|---|---|
| CN | 205727121 U | 11/2016 |
| CN | 111933857 A | 11/2020 |

(Continued)

*Primary Examiner* — Alicia Torres
(74) *Attorney, Agent, or Firm* — KENEALY VAIDYA LLP

(57) ABSTRACT

A vertical motion battery latching mechanism for a power equipment having a removable battery can include a central lever, a latch button and a vertically pushed button. The central lever can be configured to rotate about an axis. The latch button can be vertically movable by rotation of the central lever and configured to selectively secure and release the battery with respect to the power equipment. The latch button can be biased toward securing the battery onto the power equipment. The vertically pushed button can rotate about a second axis different from the first axis and be configured to contact the central lever to rotate the central lever about the first axis and release the battery from power equipment by moving the latch button vertically.

20 Claims, 8 Drawing Sheets

(51) Int. Cl.

| | |
|---|---|
| *H01M 50/209* | (2021.01) |
| *H01M 50/213* | (2021.01) |
| *H01M 50/247* | (2021.01) |
| *H01M 50/262* | (2021.01) |
| *A01D 101/00* | (2006.01) |
| *B60K 1/04* | (2019.01) |

(52) U.S. Cl.
CPC ................ *B60K 2001/0466* (2013.01); *B60K 2001/0494* (2013.01)

(56) References Cited

U.S. PATENT DOCUMENTS

| | | | |
|---|---|---|---|
| 8,653,786 | B2 | 2/2014 | Baetica et al. |
| 8,935,907 | B2 | 1/2015 | Abe et al. |
| 9,711,767 | B2 * | 7/2017 | Juenger ................. A01D 69/02 |
| 10,230,078 | B2 | 3/2019 | Kubota et al. |
| 2011/0116861 | A1 * | 5/2011 | Zhang ................. H01M 50/262 403/322.1 |
| 2022/0045399 | A1 | 2/2022 | Hennesy et al. |
| 2022/0074156 | A1 | 3/2022 | Li |

FOREIGN PATENT DOCUMENTS

| | | | |
|---|---|---|---|
| CN | 216058306 U | | 3/2022 |
| EP | 2299516 B1 | | 10/2013 |
| JP | S5959465 U | * | 4/1984 |
| WO | 2017220009 A1 | | 12/2017 |

* cited by examiner

BATTERY LATCHING MECHANISM FOR POWER EQUIPMENT, AND LAWNMOWER

BACKGROUND

The disclosed subject matter relates to a battery latching mechanism for a power equipment. More particularly, the disclosed subject matter relates to methods and apparatus that latch a removable battery onto a power equipment that is operated by an electric motor.

Power equipment such as lawnmowers, hedge trimmers, string trimmers, power saws, tillers, snow blowers, portable coolers, E-Bikes and scooters can be operated by an electric motor, or a hybrid of an internal combustion engine and an electric motor. A battery mounted on the power equipment can supply power to the electric motor. The battery can be removably mounted onto the power equipment.

SUMMARY

Some embodiments are directed to a vertical motion battery latching mechanism for a power equipment having a removable battery. The vertical motion battery latching mechanism can include a central lever, a latch button and a vertically pushed button. The central lever can be configured to rotate about an axis. The latch button can be vertically movable by rotation of the central lever and configured to selectively secure and release the battery with respect to the power equipment. The latch button can be biased toward securing the battery onto the power equipment. The vertically pushed button can rotate about a second axis different from the first axis and be configured to contact the central lever to rotate the central lever about the first axis and release the battery from the power equipment by moving the latch button vertically.

Some embodiments are directed to a battery latching mechanism for selectively securing and releasing a battery with respect to a power equipment. The battery latching mechanism can include a central lever, a latch button and a push button. The central lever can be configured to rotate about a first axis. The latch button can be selectively movable along a first direction between a locked position and a released position, the latch button can be biased into the locked position and configured to secure the battery onto the power equipment when the latch is in the locked position and the battery is mounted on the power equipment. The latch can be configured to release the battery from the power equipment when the latch is in the released position. The push button can be configured to rotate about a second axis in response to an input applied to the push button in a push direction that is substantially parallel to the first direction. Rotation of the push button about the second axis can cause the central lever to move the latch in the first direction from the locked position to the released position, and the second axis can be substantially orthogonal to the first direction.

Some embodiments are directed to a lawnmower that includes a cutter housing, a plurality of wheels, a blade, a battery, a motor, a central lever, a latch button and a push button. The cutter housing can include a blade chamber. The plurality of wheels can be connected to and supporting the cutter housing. The blade can be located in the blade chamber and rotatably mounted to the cutter housing to rotate about a blade axis. The battery and the motor can be supported on the cutter housing. The motor can be connected to and configured to selectively drive the blade and in selective electrical communication with the battery. The central lever can be supported on the cutter housing and rotatable about a first axis. The latch button can be supported on the cutter housing, connected to the central lever, and movable between a locked position and a released position. The latch button can be biased into the locked position and connected to the battery when the latch button is in the locked position. The latch button can be disengaged from the battery when the latch button is in the released position. The push button can be connected to the central lever and rotatably supported on the cutter housing for rotation about a second axis in response to an input to the push button in a direction that is substantially parallel to the blade axis. Rotational motion of the push button can rotate the central lever to move the latch from the locked position to the released position.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Electric power tools, portable coolers, E-Bikes and scooters can be collectively referred to as power equipment. The power equipment can include a removable battery (also referred to as a battery pack) and a latching mechanism that selectively locks and releases the battery from a mounting portion of the power equipment in order to avoid disengagement of the battery from live terminals on the power equipment. Some conventional latching mechanisms can include a pull up lever that a user pulls in the direction away from the power equipment. It is possible for the user's finger to get pinched between the battery and adjacent structure of the power equipment while pulling on the lever and removing the battery from the power equipment. It can be possible for a pull up lever to be inadvertently actuated if the power equipment is subjected to a sudden impact by the user. Thus, pull up levers can be disadvantageous in a latching mechanism for the battery.

Some convectional latch mechanisms can include an actuator that the user can push towards the power equipment. If the power equipment is supported on wheels, the pushing motion can be in a direction that can cause the power equipment to move along the ground. Thus, some conventional latch mechanisms that include a push button can be disadvantageous.

Figure 1:
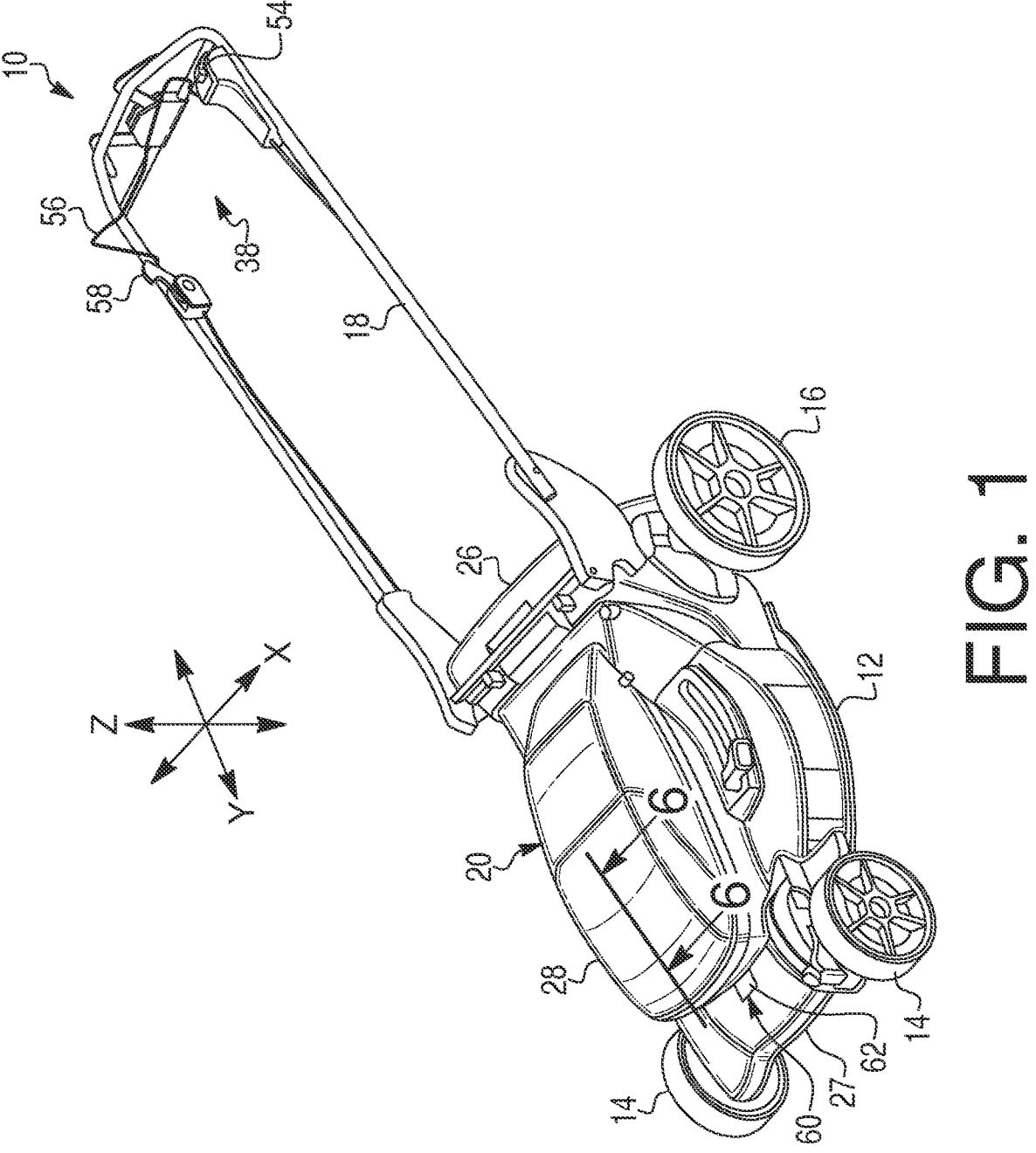
FIG. 1 is a perspective view of a power equipment made in accordance with principles of the disclosed subject matter.
Figure 2:
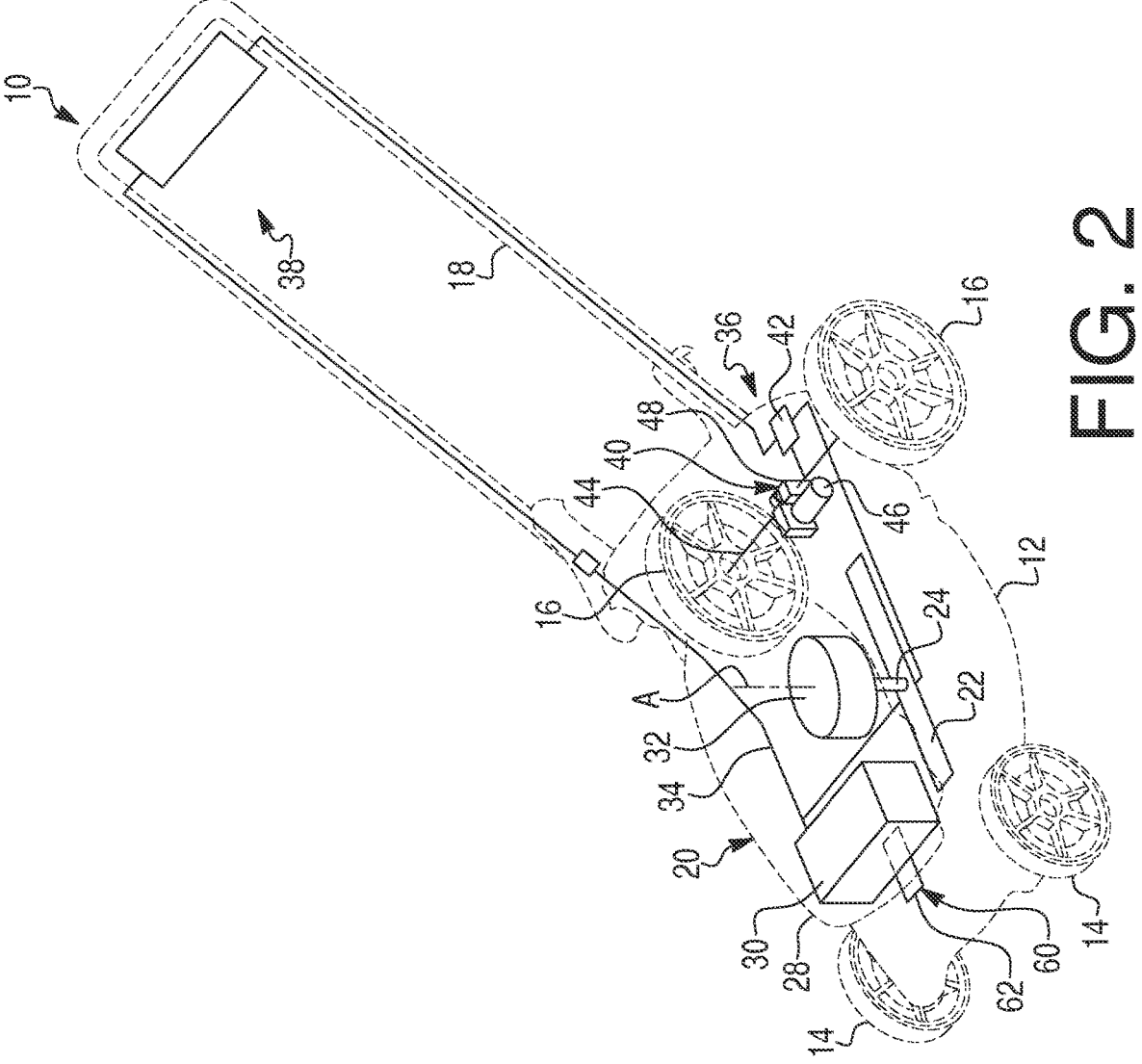
FIG. 2 is perspective schematic view of a power source assembly and a control system for operating the power equipment of FIG. 1, with exterior portions of the power equipment shown in phantom.

FIG. 1 illustrates a power equipment 1 that can include a battery latching mechanism 60 made in accordance with principles of the disclosed subject matter. The power equipment 1 can extend along an X-direction, a Y-direction and a Z-direction, which directions are orthogonal to each other. Power equipment 1 such as, but not limited to, lawnmowers, tillers snow blowers, E-Bikes and scooters, can include at least a pair of wheels or tracks that permit the power equipment 1 to move in response to an input force that has a component along the Y-direction. The wheeled power equipment 1 can be less likely to move in response to an input force that is applied in the Z-direction. Referring to FIGS. 1-4, 6 and 7, the battery latching mechanism 60 can include a push button 62 that a user can push in a direction parallel to the Z-direction (or a direction that is substantially parallel to the Z-direction which one of ordinary skill can perceive as being parallel to the Z-direction). FIGS. 1 and 2 schematically illustrate the battery latching mechanism 60 and the push button 62. Orienting the push button 62 to move in the Z-direction (or a direction that is substantially parallel to the Z-direction) can provided rigidity under shock loading and be more resilient in preventing accidental unlatching of the battery. Moreover, moving the push button 62 in the Z-direction (or a direction that is substantially parallel to the Z-direction) can provide a positive perception by the user of the operation of the push button 62 and removal of the battery from the power equipment 1. Thus, the battery latching mechanism 60 can avoid the disadvantages of the conventional latching mechanisms described above.

FIG. 1 illustrates an embodiment of a power equipment 1 that is configured as a walk-behind self-propelled lawnmower 10. The lawnmower 10 can include a cutter housing 12, a pair of front wheels 14, a pair of rear wheels 16, a handle 18, a power source assembly 20, and a control system 38. The rear wheel 16 on the right side of the lawnmower is obstructed from view in FIG. 1 by the cutter housing 12. FIG. 2 shows the right rear wheel 16 in phantom.

Referring to FIG. 2, the lawnmower 10 can include a blade 22 and a blade shaft 24 connected to each of the blade 22 and the power source assembly 20. The power source assembly 20 can be configured to selectively rotate the blade shaft 24 and the blade 22 in the cutter housing 12 about a blade axis A that extends in the Z-direction. The blade shaft 24 can be referred to as a component of the power source assembly 20. Alternatively, the blade shaft 24 can be referred to as a component that is connected to and driven by the power source assembly 20.

The cutter housing 12 can be referred to as a mower deck or as a cutter deck or as a deck. Referring to FIG. 1, the cutter housing 12 can include an opening at a rear end 26 of the cutter housing 12. The lawnmower 10 can include a collection bag that can be selectively attached to and detached from the rear end 26. The opening and the collection bag are omitted for simplicity and clarity of the drawing figures. The collection bag can be in communication with the opening such that vegetation clippings produced by the blade 22 can be collected in the collection bag.

FIG. 2 schematically illustrates exemplary components of the power source assembly 20. The power source assembly 20 can include a housing 28 (shown in phantom), a battery pack 30, a blade motor 32, a blade motor driver 34, a drive assembly 36, and the control system 38. Referring to FIGS. 1 and 2, the housing 28 can contain the battery pack 30, the blade motor 32 and the blade motor driver 34. The drive assembly 36 can be spaced away from the housing 28.

The housing 28 can include a hinged lid or a removable lid to provide access to the battery pack 30. Alternate embodiments of the housing 28 can omit the lid and merely include an open receptable for the battery pack 30. The battery latching mechanism 60 can selectively lock or release the battery pack 30 in the housing 28. The battery latching mechanism 60 can be located closer to the front end 27 of the cutter housing 12 than to the rear end 26 of the cutter housing 12 with respect to the Y-direction.

The housing 28 can include a receptacle that contains the battery pack 30. The receptacle can be opened toward the front end 27 of the lawnmower 10 and the battery can be inserted into and removed from the receptacle in the Y-direction. The receptacle can prevent movement of the battery pack 30 in the X-direction and the Z-direction, and the battery latching mechanism 60 can selectively prevent or allow movement of the battery pack 30 in the Y-direction.

Figure 6:
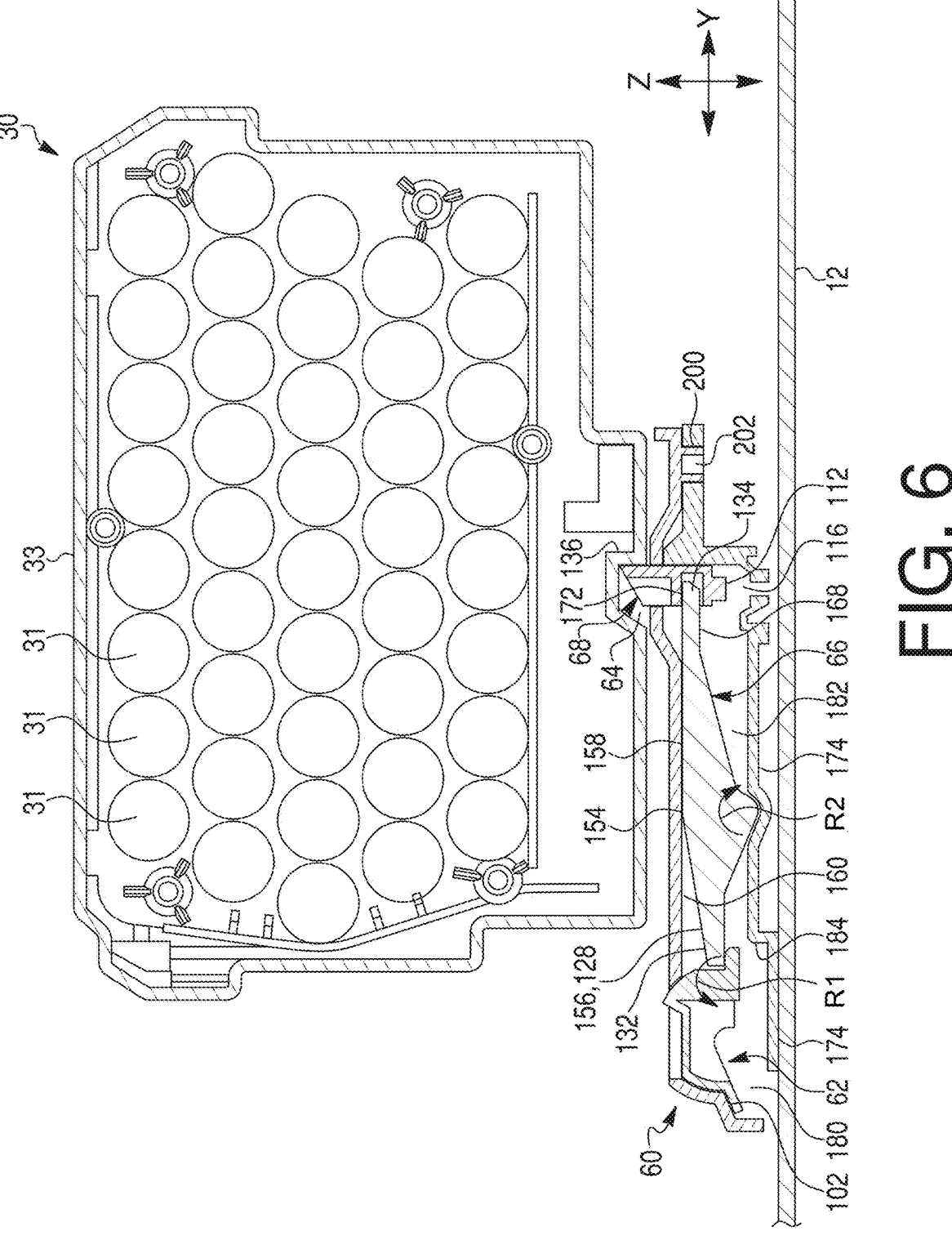
FIG. 6 is a cross-sectional view taken along line 6-6 of FIG. 1 and shows the battery latching mechanism in the locked position.
Figure 7:
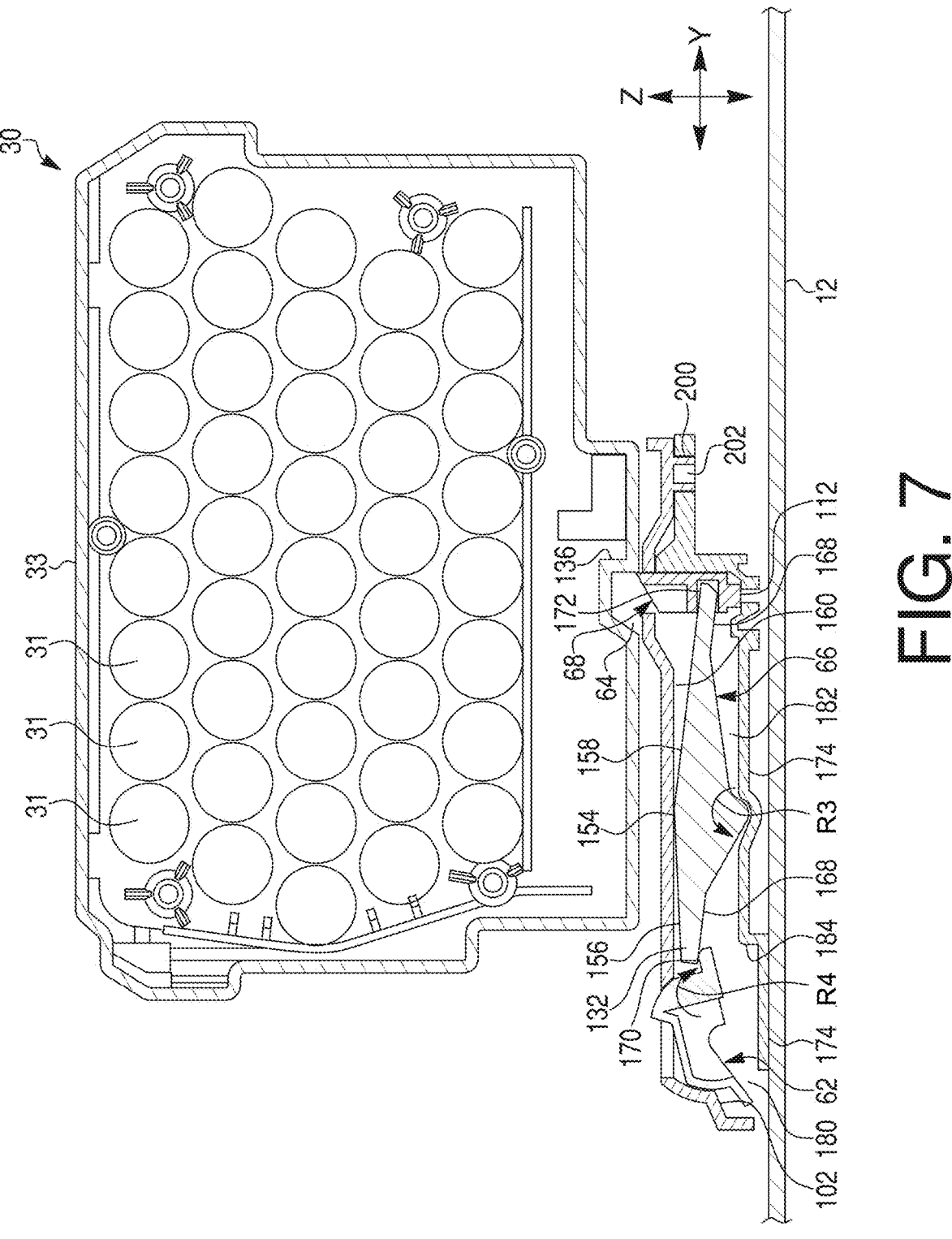
FIG. 7 is a cross-sectional view taken along line 6-6 of FIG. 1 and shows the battery latching mechanism in the released position.

FIGS. 6 and 7 show cross-sectional views of the battery pack and battery latching mechanism taken along line 6-6 of FIG. 1. The cutter housing 12 is illustrated schematically and the housing 28 has been omitted from FIGS. 6 and 7 for clarity and simplicity of the drawings. The battery pack 30 can include a plurality of battery cells 31 and a case 33 that houses the battery cells 31. The battery cells 31 can be configured to store electricity and supply electricity to any one or combination of a plurality of electrically powered devices in the lawnmower 10.

The battery latching mechanism 60 can include a lock recess 64 in the case 33 and a latch housing 70 mounted onto the cutter deck 12 between the cutter housing 12 and the battery pack 30 in the Z-direction. The latch housing 70 can include a housing base 72 and a cover 74. The cover 74 is omitted from FIG. 3 to more clearly illustrate the push button 62, the central lever 66, the latch button 68, and the housing base 72. The latch housing 70 can be mounted onto the cutter housing 12 in any appropriate manner such as, but not limited to, mechanical fasteners, adhesive, welding or any combination.

Figure 3:
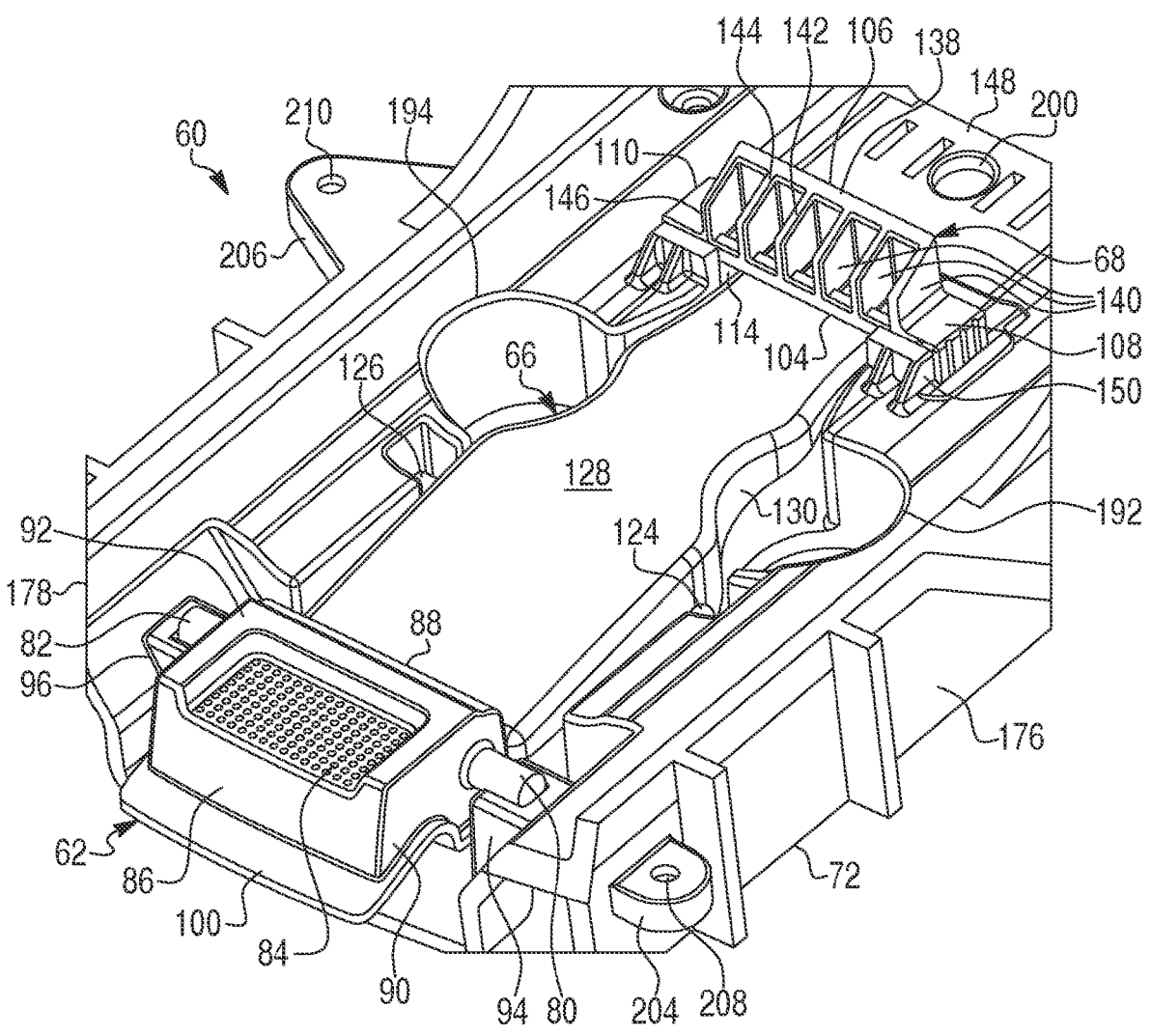
FIG. 3 is a perspective view of battery latching mechanism of the power equipment of FIG. 1.
Figure 4:
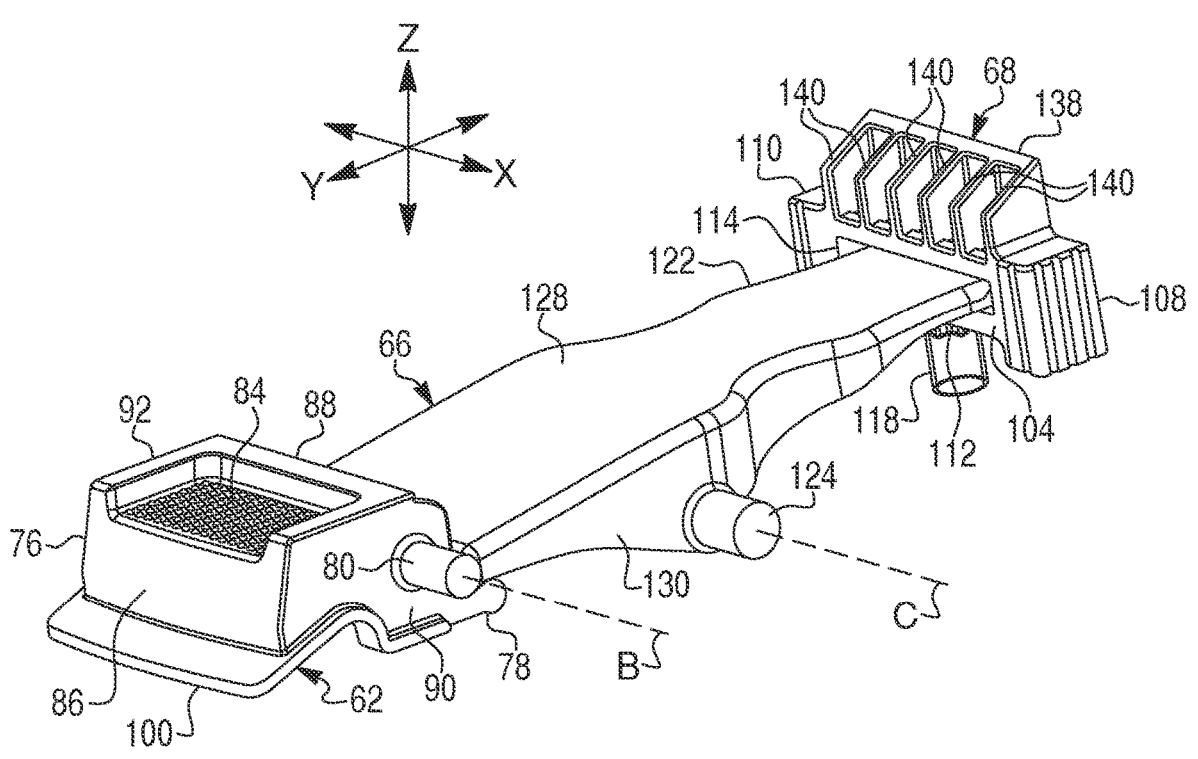
FIG. 4 is a perspective view of operational members of the battery latching mechanism of FIG. 3
Figure 8:
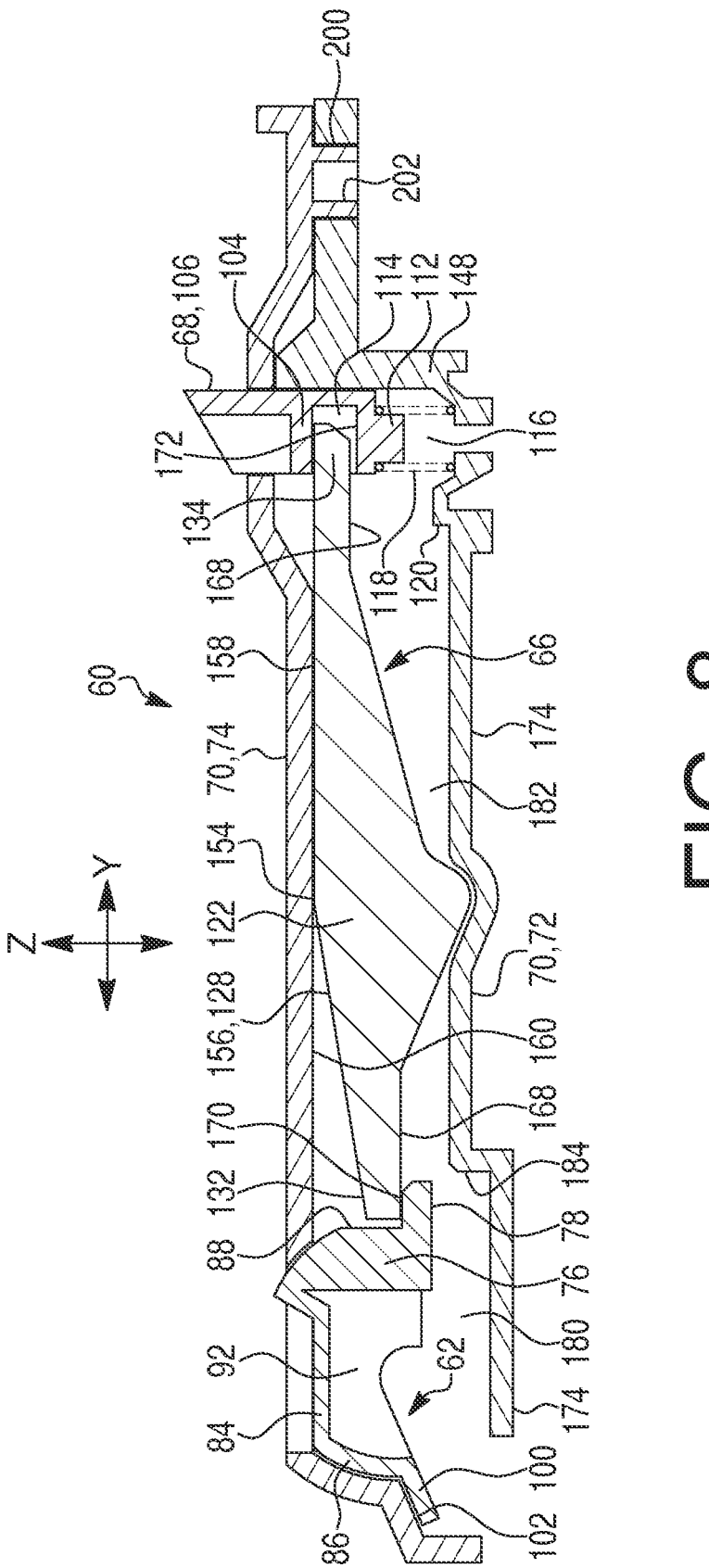
FIG. 8 is an enlarged view of a portion of FIG. 6.

Referring to FIGS. 3, 4 and 8, the battery latching mechanism 60 can include a central lever 66 and a latch button 68. The push button 62, the central lever 66 and the latch button 68 can be movably supported by the latch housing 70. FIGS. 6 and 8 show the battery latch mechanism 60 in a locked state and FIG. 7 shows the battery latching mechanism 60 in a released state. The latch button 68 can extend into the lock recess 64, engage the battery case 33, and prevent removal of the battery pack 30 in the Y-direction when the battery latch mechanism 60 is in the locked state. The latch button 68 can be positioned outside of the lock recess 64 to disengage the battery case 33 and allow removal of the battery pack 30 in the Y-direction when the battery latch mechanism 60 is in the unlocked state.

When the battery pack 30 is mounted onto the lawnmower 10, a user can remove the battery pack 30 for charging or replacement by a fully charged battery pack 30 by pressing on the push button 62 in the Z-direction. This input can cause the push button 62 to rotate in a first rotational direction R1 (FIG. 6) and into the released position shown in FIG. 7. The push button 62 can abut the central lever 66 and rotation of the push button 62 in the first rotational direction R1 can cause the central lever 66 to rotate in a second rotational direction R2 (FIG. 6) that is opposite to the first rotational direction R1 and into the released position shown in FIG. 7. The central lever 66 can abut the latch button 68 and rotation of the central lever 66 in the second rotational direction R2 can cause the latch button 68 to move out of the lock recess 64 in the Z-direction and disengage from the battery case 33 to allow movement of the battery pack 30 away from the housing 28 in the Y-direction and into the released position shown in FIG. 7.

Referring to FIGS. 4 and 8. the battery latching mechanism 60 can include a coil spring 118 that is schematically illustrated. The coil spring 118 is omitted from FIGS. 6 and 7 for clarity and simplicity of the drawings. The coil spring 118 can bias the latch button away from the housing base 72 and toward the battery pack 30.

After the battery pack 30 has been inserted into the receptable of the housing 28, the elastic restoring force in the coil spring 118 can push the latch button 68 in the Z-direction and into the recess 64 in the battery case 33 such that the latch button 68 is in the locked position shown in FIG. 6. This movement of the latch button 68 can cause the central lever 66 to rotate in a third rotational direction R3 (FIG. 7) and into the locked position shown in FIG. 6. Rotation of the central lever 66 in the third rotational direction R3 can cause the push button 62 to rotate in a fourth rotational direction R4 (FIG. 7) and into the locked position shown in FIG. 6. The third rotational direction R3 is opposite to the second rotational direction R2 and the fourth rotational direction R4 is opposite to the first rotational direction R1 and the third rotational direction R3. Thus, the coil spring 118 can return the battery latching mechanism 60 from the released state of FIG. 7 to the locked state of FIG. 6.

Further, the coil spring 118 can be partially compressed when each of the push button 62, the central lever 66 and the latch button 68 are in the locked position. The elastic return force remaining in the partially compressed spring 118 can maintain the latch button 68 in lock recess 64. The latch button 68 can transfer the elastic return force of the partially compressed coil spring 118 into a torque that can rotate the central lever 66 in the third rotational direction R3 (FIG. 7) and the push button 62 in the fourth rotational direction R4. At least the push button 62 can abut a stop surface 102 of the cover 74. The stop surface 102 can resist the torque applied to the push button 62 when the push button 62 is in the locked position shown in FIG. 6. Thus, the battery latching mechanism 60 can prevent or reduce in number the occurrences of an accidental release of the battery pack 30 if the lawnmower 10 is subjected to an impact force during operation of the lawnmower 10.

Referring to FIGS. 3, 4 and 8, the push button 62 can include a button body 76, a tab 78, and a pair of pins 80, 82. The second pin 82 is obstructed from view in FIG. 4 and the tab 78 is obstructed from view in FIG. 3.

The button body 76 can include an actuation surface 84, a front end 86, a rear end 88, and a pair of sides 90, 92. The actuation surface 84 can be exposed outside of the housing 70 and on an upper side of the cutter housing 12. The actuation surface 84 can be a roughed surface that can enhance contact with a user's finger during actuation of the push button 62. The front end 86 can face toward the front end 27 of the lawnmower 10 in the Y-direction, and the rear end 88 can face toward the rear end 26 of the lawnmower 10 in the Y-direction. The first side 90 and second side 92 can each extend from the front end 86 to the rear end 88 in the Y-direction and face away from each other in the X-direction.

The tab 78 can protrude from the button body 76 toward the rear end 26 of the lawnmower 10. The tab can be located on the rear end 88 and can extend in the X-direction and in the Y-direction. The tab 78 can be spaced away from the actuation surface 84 in the Z-direction and configured to contact the central lever 66 to cause the central lever 66 to rotate in the first rotational direction R1.

The pins 80, 82 can protrude from the button body 76 in the X-direction. The first pin 80 can protrude from the first side 90 and the second pin 82 can protrude from the second side 92. The pins 80, 82 can be spaced away from each of the front end 86 and the rear end 88 in the Y-direction. The pins 80, 82 can have a cylindrical shape.

Figure 5:
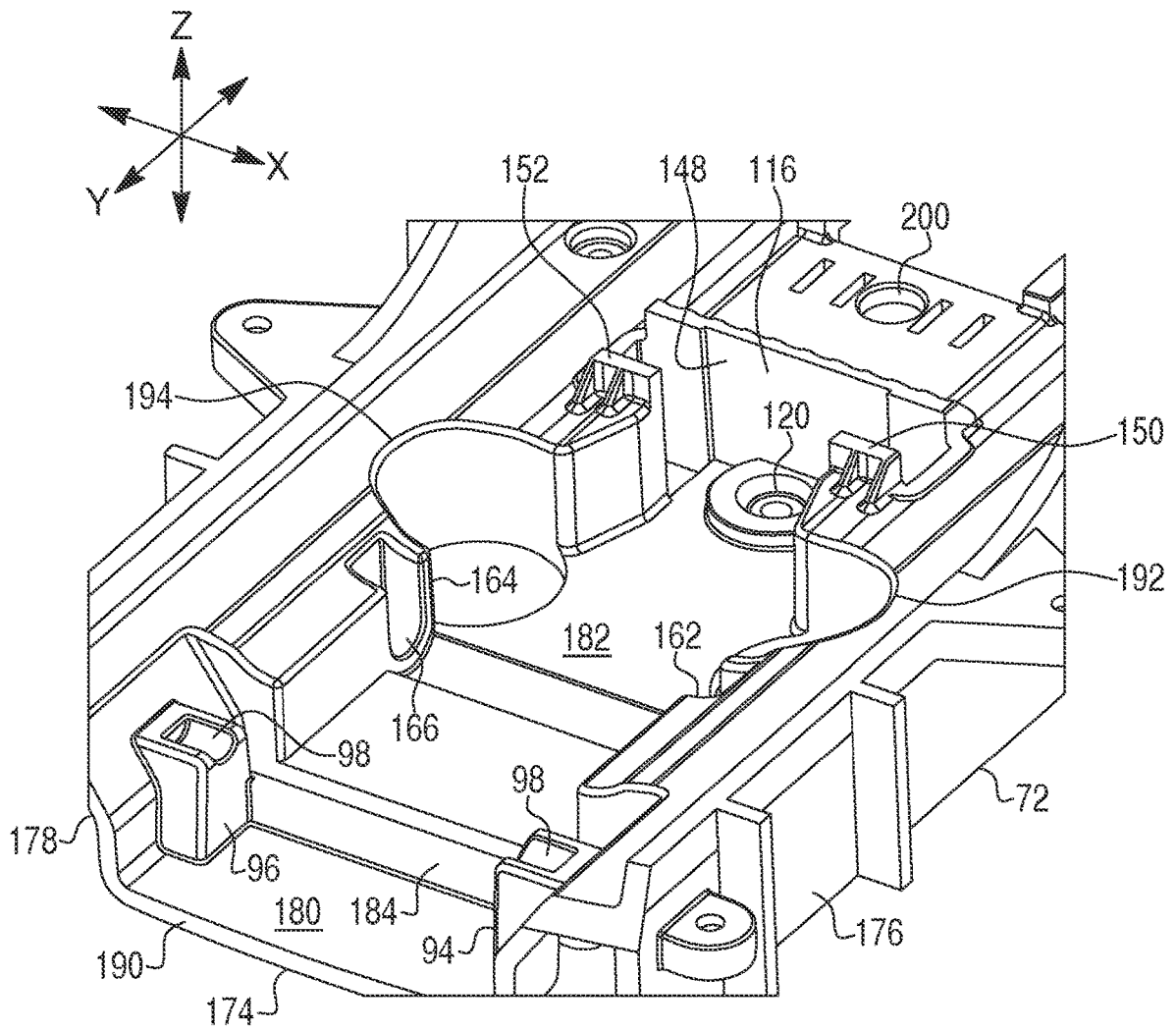
FIG. 5 is a perspective view of a latch housing of the battery latching mechanism of FIG. 3.

Referring to FIG. 3-5, the housing base 72 can include a pair of button bearings 94, 96 that support the pins 80, 82 for rotation of the push button 62 about a button axis B (FIG. 4). The button axis B can pass through the centers of the pins 80, 82. The button axis B can extend in the X-direction. Each of the button bearings 94, 96 can include a semicylindrical recess 98 (FIG. 5) that is complementary to the cylindrical shape of the pins 80, 82.

Returning to FIGS. 3 and 4, the button body 76 can include a stop 100 protruding from the front end 86 of the button body 76 in the Y-direction. As shown in FIGS. 6 and 8, the stop 100 can be configured to abut the inner surface 102 on the cover 74 when the push button 62 is in the locked position such that the stop 100 limits rotary motion of the push button 62 about the button rotation axis B in the fourth rotational direction R4 (FIG. 7).

Referring to FIGS. 3, 4 and 8, the latch button 68 can include a latch body 104, a lock protrusion 106, a pair of guides 108, 110 and a spring post 112. The latch body 104 can include a recess 114 into which the central lever 66 can extend in the Y-direction. The lock protrusion 106 can engage a wall 136 (FIGS. 6 and 8) along the lock recess 64 of the battery pack 30 is in the locked position of FIG. 6. The lock protrusion 106 can be disengaged from the wall 136 when the battery latching mechanism 60 is in the released position of FIG. 7. The spring post 112 can extend inside one end of the coil spring 118 and the other end of the coil spring 118 can be supported in a spring housing 120 (FIG. 5) formed in the housing base 72.

The lock protrusion 106 can include a main wall 138 and a plurality of ribs 140 that extend from the main wall 138. The main wall 138 can extend along the latch body 104 in the X-direction and the ribs 140 can extend along the latch body 104 in the Y-direction. The main wall 138 and the ribs 140 can protrude from the latch body 104 in the Z-direction. Each of the ribs 140 can include an inclined edge 142 that is inclined relative to the Y-direction and the Z-direction. Each of the inclined edges 142 can include a high end 144 and a low end 146 located between the high end 144 and the pins 124 of the central lever with respect to the Y-direction.

Referring to FIG. 5, the housing base 72 can include a latch cavity 116, an end wall 148 and a pair of guide walls 150, 152. The latch cavity 116 can contain the latch button 68 and the walls 148, 150, 152 can guide the latch button 68 when the latch button 68 moves in the Z-direction toward or away from the lock recess 64 in the battery pack 30. The guide walls 150, 152 can oppose the end wall 148 in the Y-direction. The first guide 108 can abut and slide along each of the end wall 148 and the first guide wall 150 and the second guide 110 can abut and slide along each of the end wall 148 and the second guide wall 152.

Referring to FIGS. 3 and 4, the central lever 66 can include a lever body 122 and a pair pins 124, 126. The second pin 126 is obstructed from view in FIG. 4. The lever body 122 can be elongated in the Y-direction and can include a top surface 128, a first side 130 and a second side that is a mirror image of the first side 130. The second side is obstructed from view in FIGS. 3 and 4. The lever body 122 can include a first end 132 and a second end 134. The first end 132 can abut the tab 78 of the push button 62 and the second end 134 can extend into recess 114 of the latch button 68 and abut the latch button 68 on a surface that bounds the recess 114.

Referring to FIG. 8, the top surface 128 can have a peak 154 generally aligned above the central lever pins 124, 126. The top surface 128 can include a first sloped section 156 that extends in the Y-direction from the peak 154 to the first end 132 and a second sloped section 158 that extends in the Y-direction from the peak 154 to the second end 134. The first sloped section 156 and the second sloped section 158 can be flat surfaces, curved surfaces or a combination of flat and curved surface sections. A portion of the top surface 128 spanning from the peak 154 and along second sloped surface 158 can abut an inner surface 160 of the cover 74.

The lever body 122 can pivot relative to the base 72 about a lever rotation axis C that passes through the centers of the pins 124, 126. The pins 124, 126 can protrude from the first side 130 and the second side in the X-direction at a location that is spaced away from the ends 132, 134 in the Y-direction and spaced away from the peak 154 of the top surface 128 in the Z-direction. The pins 124, 126 can be aligned with the peak 154 in the Z-direction. The pins 124, 126 can have a cylindrical shape.

The base 72 can include a pair of lever bearings 162, 164 that support the pins 124, 126 for rotation about the lever rotation axis C. The lever rotation axis C can extend in the X-direction. Each of the lever bearings 162, 164 can include an elongated recess 166 that has a semicylindrical bottom surface (FIG. 5) that is complementary to the cylindrical shape of the pins 124, 126.

Referring to FIGS. 4 and 6-8, a bottom surface 168 at the first end 132 of the central lever 66 can abut a top surface 170 of the tab 78. When a user pushes down on the push button 62 in the Z-direction, the upper surface 170 can push up on the lower bottom surface 168 to rotate the central lever 66 in the second direction R2.

The bottom surface 168 at the second end 134 of the central lever 66 can abut a lower surface 172 of the recess 114 in the latch button 68 when the user pushes down on the push button 62 and the central lever 66 rotates in the second direction R2.

When the user releases the push button 62, the coil spring 118 can push the latch button 68 into the position shown in FIGS. 6 and 8 and the lower surface 172 of the recess 114 can push up on the bottom surface 168 of the central lever 66 to rotate the central lever 66 in the third rotational direction R3. In turn, rotation of the central lever 66 in the third direction R3 can cause the bottom surface 168 at the first end 132 to push down on the tab 78 of the push button 62 and cause the push button 62 to rotate in the fourth direction R4. This motion can also occur when the user inserts a battery pack 30 into the empty battery receptacle of the housing 28.

Referring to FIG. 5, the housing base 72 can include a bottom wall 174, a pair of side walls 176, 178. The walls 174, 176, 178, the end wall 148 and the cover 74 can collectively form the latch cavity 116, a button cavity 180, and a lever cavity 182 that contain the latch button 68, the push button 62 and the central lever 66, respectively. The bottom wall 174 can include a step 184 that is a common boundary of the button cavity 180 and the lever cavity 182. The button cavity 180 can extend from a front edge 190 of the housing base 72 to the step 184. The first side wall 176 can include the first guide wall 150 and the second side wall 178 can include the second guide wall 152. The guides walls 150, 152 can extend along a plane in the X-direction and the Z-direction that is a common boundary of the lever cavity 182 and the latch cavity 116.

The button bearings 94, 96 can be located in the button cavity 180 at a position that is adjacent to or abuts the step 184 and extends from the bottom wall 174 in the Z-direction. The first button bearing 94 can extend from the first side wall 176 and into the button cavity 180 and the second button bearing 96 can extend from the second side wall 178 and into the button cavity 180 in the X-direction. The bottom of the semicylindrical recesses 98 can be spaced above the step 184 in the Z-direction.

The first side wall 176 can include first protrusion 186 that extends into the lever cavity 182 and the second side wall 178 can include second protrusion 188 that extends into the lever cavity 182 in the X-direction, from the step 184 in the Z-direction and long the lever cavity 182 in the Y-direction. The protrusions 186, 188 can include the lever bearings 94, 96.

The first side wall 176 can include a first arcuate recess 192 and the second side wall 178 can include a second arcuate recess 194 that opposes the first arcuate recess in the X-direction. The first arcuate recess 192 can be adjacent to the first protrusion 186 and the second arcuate recess 194 can be adjacent to the second protrusion 188 in the Y-direction. The arcuate recesses 192, 194 can be spaced away from the guide walls 150, 152 in the Y-direction.

Referring to FIG. 3, the central lever 66 can include a pair of lever recesses 196, 198 that extend along the sides 130, 132 in the Y-direction and the Z direction and are recessed in the X-direction. The first lever recess 196 can be aligned with the first arcuate recess 192 in the Y-direction and oppose the first arcuate recess 192 in the X-direction. The second lever recess 198 can be aligned with the second arcuate recess 194 in the Y direction and oppose the second arcuate recess 194 in the X direction. The recesses 192, 194, 196, 198 can facilitate assembly and/or removal of the central lever 66 into the lever cavity 182.

Referring to FIGS. 3 and 5, a through hole 200 can extend through the end wall 148. Referring to FIGS. 6-8, the cover 74 can include a post 202 that extends into the through hole 200.

The housing base 72 can be secured to the cutter housing 12 in any appropriate manner. For example, the housing base 72 can include flanges spaced along the side walls 176, 178. Mechanical fasteners such as, but not limited to threaded fasteners, rivets, elastic clips can connect the housing base 72 directly to the cutter housing 12 or indirectly to a different structure that is directly or indirectly connected to the cutter housing 12. Referring to FIGS. 3 and 5, the first side wall 176 can include a first flange 204 and the second wall 178 can include a second flange 206. Each of the flanges can include a respective through hole 208, 210 that can receive an appropriate one of the mechanical fasteners. FIGS. 3 and 5 are partial views of the housing base 72 and the first side wall 176 can include a flange that is a mirror image of the second flange 206 and aligned with the second flange 206 in the X-direction. The second sidewall 178 can include a flange that is a mirror image of the first flange 204 aligned with the first flange 204 in the X direction. The housing base 72 can include additional mounting points spaced along the side walls 176, 178 and the end wall 148.

Returning to FIGS. 1 and 2, the control system 38 can include a plurality of user inputs including a handle lever 54, a blade lever 56 and transmission speed lever 58. The control system 38 can be mounted on the handle 18 in any appropriate position and orientation on the handle 18 that can facilitate actuation of the user inputs by an operator of the lawnmower 10. The control system 38 can be configured to actuate one or more operational features of the lawnmower 10. In addition, the control system 38 can be a control-by-wire system. The handle lever 54 (also referred to as operator presence lever or switch) can be mounted on the handle 18. The blade lever 56 (also referred to as a blade bail or a blade brake, or a blade brake lever) can be rotatably mounted on the handle 18.

The blade motor 32 can be a direct current electric motor or an alternating current electric motor. Embodiments can include a blade motor 32 that is configured as a direct current outer rotor motor that includes an inner stator and an outer rotor. The blade motor 32 can include one or more sensors that provide the blade motor driver 34 with information regarding the temperature, rotational speed, power output, etc., of the blade motor 32. The outer rotor of the blade motor 32 can be directly connected to the shaft 24 in any appropriate manner such that the blade motor 32 can cause the blade shaft 24 to rotate.

The blade motor driver 34 can be in electrical communication with each of the battery pack 30 and the blade motor 32. The blade motor driver 34 can be configured to convert power from the battery pack 30 into output power supplied to the blade motor 32. The blade motor driver 34 can be configured to monitor the operational conditions of the blade motor 32 and the battery pack 30. The blade motor driver 34 can be configured to control the voltage and/or current output by the battery pack 30 based on the operational conditions of the blade motor 32 and the battery pack 30 switching one or more power transistors to adjust the supply of electrical power to the blade motor 32.

The blade motor driver 34 can also be configured to control the voltage or current output by the battery pack 30, and to supply the voltage or current to the blade motor 32 using the one or more power transistors based on one or more inputs to the control system 38 by the operator of the electric lawnmower 10.

The blade motor driver 34 can be configured to initiate, adjust or terminate supply of voltage or current from the battery pack 30 to the blade motor 32 based on inputs received from the control system 38, the battery pack 30 and the blade motor 32. The blade motor driver 34 can also be configured to regulate the charging of the battery cell(s) of the battery pack 30.

The drive assembly 36 can be mounted to the cutter housing 12 at a position that is underneath the cutter housing 12. The drive assembly 36 can include a drive transmission 40 and a propulsion motor driver 42. The propulsion motor driver 42 can be in electrical communication with each of the battery pack 30 and the drive transmission 40. A drive shaft 44 can be connected to each of the drive transmission 40 and at least one of the rear wheels 16 (and/or front wheel(s) 14) in any appropriate manner such that the drive shaft 44 to rotate, which in turn can cause the rear wheels 16 (and/or front wheel(s) 14) to rotate.

The drive transmission 40 can also include a propulsion motor 46 and a gear transmission 48 connecting the propulsion motor 46 to the drive shaft 44. The propulsion motor 46 can be a direct current electric motor or an alternating current electric motor. The propulsion motor 46 can include one or more sensors that provide the propulsion motor driver 42 with information regarding the temperature, rotational speed, power output, etc., of the propulsion motor 46.

The propulsion motor driver 42 can be in electrical communication with each of the battery pack 30, the control system 38 and the propulsion motor 46. The propulsion motor driver 42 can be configured to convert power from the battery pack 30 into output power supplied to the propulsion motor 46. The propulsion motor driver 42 can be configured to monitor the operational conditions of the propulsion motor 46 and the battery pack 30. The propulsion motor driver 42 can be configured to control the voltage or current output by the battery pack 30 based on the operational conditions of the propulsion motor 46 and the battery pack 30 by switching one or more power transistors to adjust the supply of electrical power to the propulsion motor 46.

The propulsion motor driver 42 can also be configured to control the voltage or current output by the battery pack 30, and to supply the voltage or current to the propulsion motor 46 based on one or more inputs by the operator of the electric lawnmower 10 using the one or more power transistors.

The propulsion motor driver 42 can be configured to initiate, adjust or terminate supply of voltage or current from the battery pack 30 to the propulsion motor 46 based on inputs received from the battery pack 30, the propulsion motor 46, and/or one or more user inputs to the control system 38.

While certain embodiments of the invention are described above, it should be understood that the invention can be embodied and configured in many different ways without departing from the spirit and scope of the invention.

For example, embodiments are disclosed above in the context of a lawnmower shown in FIG. 1. However, the battery latching mechanism 60 can be provided on any electric powered power equipment such as, but not limited to, a snow blower, a tiller, a string trimer, a hedge trimmer, a power saw, a portable cooler, an E-Bike and a scooter.

It should be noted that the mechanism as a whole can be oriented in any position. For example, the latch button 68 may move in a horizontal movement (instead of vertical direction) in order to de-latch the battery. Alternatively, the latch button 68 could move diagonally. The mix of terms such as "horizontal" and "vertical" motion should not bind the present disclosure in one specific orientation—each of the buttons 62, 68 and latches can move in various directions (including directions offset from vertical or horizontal directions) and still remain with the scope of the present disclosure.

In particular, the exemplary X-direction, Y-direction and Z-direction described above can represent a three-dimensional coordinate system for the lawnmower 10 as an exemplary power equipment. However, alternate embodiments of the power equipment can be described by a three-dimensional XYZ coordinate system that is rotated relative to the XYZ coordinate system shown in FIG. 1. For example, instead of the Z-direction extending in a vertical direction and the X-direction and Y-direction extending in a horizontal direction as shown in FIG. 1, the XYZ coordinate system can be misaligned with respect to the vertical and horizontal directions.

Further, alternate embodiments of the battery latching mechanism 60 can be described by a three-dimensional coordinate system that is independent of the three-dimensional coordinate system of the power equipment. For example, instead of the X-direction, Y-direction and Z-direction of the lawnmower 10 shown in FIG. 4, the battery latching mechanism 60 can be described by an alternate coordinate system that includes an X'-direction, a Y' direction and a Z'-direction that are orthogonal to each other and at an acute angle relative to the X-direction, Y-direction and Z-direction, respectively, shown in FIG. 1.

Instead of mounting the battery latching mechanism 60 adjacent to the cutter housing 12, the battery latching mechanism 60 can be mounted on either side of the housing 20 and rotated ninety degrees with respect to the orientation shown in FIGS. 1-7. As a result, the rotation axes B, C can extend in the Z-direction, the latch button 68 can move toward and away from the battery pack 30 in the X-direction and a force applied to the push button 62 in the X-direction can cause the push button 62 to rotate about the button rotation axis B.

The lawnmower can be a walk-behind lawnmower, a ride-on lawnmower, a zero-turn-radius lawnmower, a remote-controlled lawnmower, an autonomous lawnmower, or a semi-autonomous lawnmower.

Instead of inserting and removing the battery pack 30 from the front of the lawnmower 10, alternate embodiments of the lawnmower 10 can be configured for insertion/removal of the battery pack from either side, the rear, or the top of the lawnmower 10.

Alternate embodiments of the battery latching mechanism can substitute a leaf spring for the coil spring. In alternate embodiments, the leaf spring can be formed separately from the latch button. Alternate embodiments can include the leaf spring as an integrated and homogenous portion of the latch body.

What is claimed is:

1. A vertical motion battery latching mechanism for a power equipment having a removable battery, comprising:
   a central lever that is configured to rotate about an axis;
   a latch button that is vertically movable relative to the central lever by rotation of the central lever and configured to selectively secure and release the battery with respect to the power equipment, the latch button is biased toward securing the battery onto the power equipment; and
   a vertically pushed button that rotates about a second axis different from the first axis and is configured to contact the central lever to rotate the central lever about the first axis and release the battery from the power equipment by moving the latch button vertically.

2. The vertical motion battery latching mechanism according to claim 1, further comprising:
   a latch housing configured to be mounted on the power equipment and positioned below the battery, the latch housing includes a latch cavity that supports the latch button when the latch button moves vertically.

3. The vertical motion battery latching mechanism according to claim 2, further comprising:
   a coil spring that has a first end and a second end, wherein
   the latch button includes a spring post that extends into the first end of the coil spring, and
   the latch housing includes a spring housing that is located in the latch cavity and surrounds the second end of the coil spring.

4. The vertical motion battery latching mechanism according to claim 2, wherein
   the latch housing includes a pair of bearings, and
   the vertically pushed button includes, a button body that includes an actuation surface,
   a tab that protrudes from the button body and is spaced away from the actuation surface, the tab configured to contact the central lever to cause the central lever to rotate, and
   a pair of pins protrude from the button body, the pins are supported on the bearings, and the vertically pushed button rotates about the pins when the button is pushed.

5. The vertical motion battery latching mechanism according to claim 2, wherein
   the latch housing includes a pair of bearings and a lever cavity that extends from the latch cavity,
   the central lever includes a lever body and a pair of pins extending from the lever body and supported in the bearings, the central lever is configured to rotate about the pins, the lever body includes a first end that abuts the vertically pushed button and a second end that abuts the latch button.

6. The vertical motion battery latching mechanism according to claim 2, wherein
   the vertically pushed button rotates in a first direction when pushed vertically, and
   the central lever rotates in a second direction when the vertically pushed button is pushed vertically, the second direction is opposite to the first direction.

7. The vertical motion battery latching mechanism according to claim 2, wherein
   the latch housing includes,
      an end wall that extends along the latch cavity, and
      a pair of guide walls that are spaced away from and oppose the end wall, and
   the latch button includes,
      a latch body that includes a recess,
      a lock protrusion extending vertically away from the latch body and configured to engage a lock recess of the battery when the battery is mounted on the power equipment, and
      a pair of guides protruding from the latch body, a first one of the guides is located between the end wall and a first one of the guide walls, and a second one of the guides is located between the end wall and a second one of the guide walls, and
   the central lever extends between the guide walls and into the recess of the latch body.

8. A battery latching mechanism for selectively securing and releasing a battery with respect to a power equipment, comprising:
   a central lever configured to rotate about a first axis;
   a latch button selectively movable relative to the central lever along a first direction between a locked position and a released position, the latch button is biased into the locked position, the latch button is configured to secure the battery onto the power equipment when the latch button is in the locked position and the battery is mounted on the power equipment, the latch button is configured to release the battery from the power equipment when the latch button is in the released position; and
   a push button configured to rotate about a second axis in response to an input applied to the push button in a push direction that is substantially parallel to the first direction, wherein rotation of the push button about the second axis causes the central lever to move the latch button in the first direction from the locked position to the released position, and the second axis is substantially orthogonal to the first direction.

9. The battery latching mechanism according to claim 8, wherein the push button is configured to rotate in a first rotational direction and rotation of the push button in the first rotational direction causes the central lever to rotate in second rotational direction that is opposite to the first rotational direction.

10. The battery latching mechanism according to claim 9, further comprising:

a latch housing that supports rotary motion of the central lever about the first axis, rotary motion of the push button about the second axis, and sliding motion of the latch button in the first direction.

11. The battery latching mechanism according to claim 8, wherein the push button is spaced away from the latch button in a second direction that is orthogonal to the first direction, the central lever extends from and abuts each of the push button and the latch button.

12. The battery latching mechanism according to claim 8, wherein the push button includes, a button body that has a front end, a rear end, a first side, and a second side, wherein the first side and second side each extend from the front end to the rear end, a first pin protruding from the first side and spaced away from the front end and the rear end, a second pin protruding from the second side and spaced away from the front end and the rear end, and a tab protruding away from the rear end and toward the central lever, the tab configured to engage the central lever when the push button rotates about the second axis in a first rotational direction and causes the central lever to rotate.

13. The battery latching mechanism according to claim 12, wherein the push button includes a stop protruding from the front end, the stop is configured to abut a stop surface of the power equipment when the latch button is in the locked position such that the stop limits rotary motion of the push button about the second axis.

14. The battery latching mechanism according to claim 8, further comprising:

a lock recess formed in the battery, and the latch button extends into the lock recess when the latch button is in the locked position and the battery is mounted on the power equipment.

15. The battery latching mechanism according to claim 8, further comprising:

a spring connected to the latch button and biasing the latch button into engagement with the battery to secure the battery when the battery is mounted on the power equipment.

16. A lawnmower comprising:

a cutter housing including a blade chamber;

a plurality of wheels connected to and supporting the cutter housing;

a blade in the blade chamber and rotatably mounted to the cutter housing to rotate about a blade axis;

a battery supported on the cutter housing;

a motor mounted on the cutter housing, the motor is connected to and configured to selectively drive the blade, and the motor is in selective electrical communication with the battery;

a central lever supported on the cutter housing and rotatable about a first axis;

a latch button supported on the cutter housing, connected to the central lever, and movable relative to the central lever between a locked position and a released position, the latch button is biased into the locked position, the latch button is connected to the battery when the latch button is in the locked position, the latch button is disengaged from the battery when the latch button is in the released position; and a push button connected to the central lever and rotatably supported on the cutter housing for rotation about a second axis in response to an input to the push button in a direction that is substantially parallel to the blade axis, wherein rotational motion of the push button rotates the central lever to move the latch button from the locked position to the released position.

17. The lawnmower according to claim 16, wherein the latch button moves between the locked position and the released position in a direction that is parallel to the blade axis, and each of the first axis and the second axis are substantially orthogonal to the blade axis.

18. The lawnmower according to claim 16, further comprising:

a latch housing positioned between the cutter housing and the battery, the latch housing includes, a latch cavity having an end wall and a pair of guide walls that are spaced away from and oppose the end wall, the latch button is located in the latch cavity and guided by the end wall and the pair of guide walls as the latch button moves between the locked position and the released position, a lever cavity that extends from the latch cavity and contains the central lever, a pair of first bearings located adjacent to the lever cavity and configured to support rotary motion of the central lever, a button cavity that extends from the lever cavity and contains the push button, and a pair of second bearings located in the button cavity and configured to support rotary motion of the push button.

19. The lawnmower according to claim 16, wherein the latch button includes a recess, the push button includes a tab, the central lever includes, a first end that extends into the recess, a second end contacts the tab when the push button causes the central lever to rotate, and a pair of pins spaced away from the first end and the second end, the central lever configured to rotate about the pins.

20. The lawnmower according to claim 16, further comprising:

a handle, wherein the cutter deck includes a front end a rear end, the handle is connected to and extends away from the rear end of the cutter deck, the push button is located closer to the front end than to the rear end of the cutter deck.

* * * * *